M. PATRICK.
REINFORCEMENT FOR PNEUMATIC TIRES.
APPLICATION FILED AUG. 28, 1914.
1,159,414.     Patented Nov. 9, 1915.
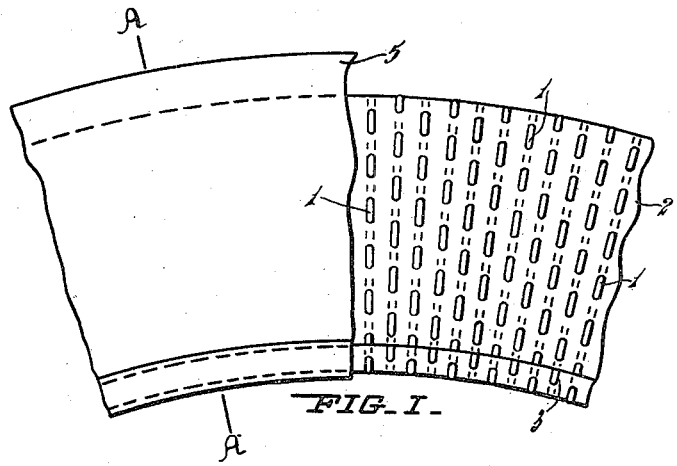
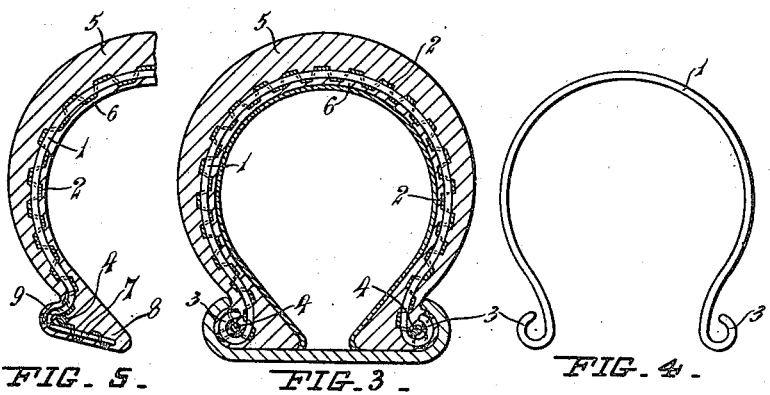
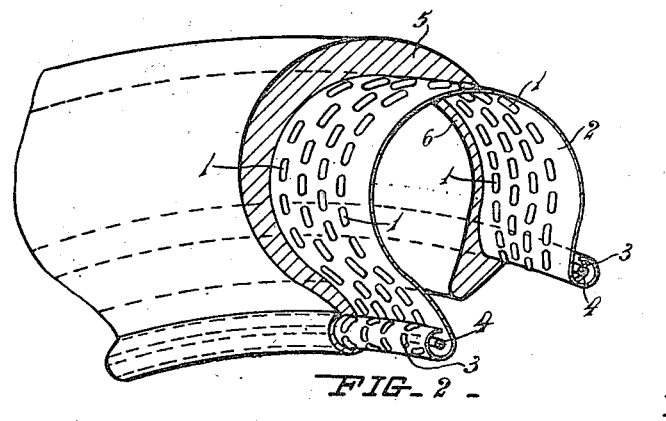
WITNESSES:
John A. Percival.
Fred H. Pohl
INVENTOR
MAXTON PATRICK
BY
ATTORNEY

UNITED STATES PATENT OFFICE.

MAXTON PATRICK, OF GERALDINE, SOUTH CANTERBURY, NEW ZEALAND.

REINFORCEMENT FOR PNEUMATIC TIRES.

1,159,414.

Specification of Letters Patent.

Patented Nov. 9, 1915.

Application filed August 28, 1914. Serial No. 859,125.

*To all whom it may concern:*

Be it known that I, MAXTON PATRICK, a citizen of the Dominion of New Zealand, and residing at Geraldine, South Canterbury, in the Provincial District of Canterbury, in the Dominion of New Zealand, have invented certain new and useful Improvements in Reinforcement for Pneumatic Tires, of which the following is a specification.

This invention relates to pneumatic tires and provides improved means for reinforcing rubber tires so that they shall withstand great pressure of inflation by compressed air.

The object of the invention is to increase considerably the life of pneumatic tires by preventing blow outs so common with tires of this description.

The invention consists in forming a metal reinforcement consisting of a plurality of wire hoops shaped to correspond to a cross section of the tire, the said hoops being woven or threaded into canvas, the outer cover and an inner lining of rubber being superposed upon the canvas and the hoops.

The manufacture of the reinforcement is conveniently carried out by inserting lengths of wire into a strip of canvas and afterward pressing the same until the wires assume a hoop shape corresponding to the cross section of the tire.

The invention is illustrated in the accompanying drawing wherein:—

Figure 1, is a side elevation, and Fig. 2, is a perspective elevation partly in section of a portion of a tire embodying the invention, Fig. 3, is a cross section of the tire on line A—A of Fig. 1, Fig. 4, is an elevation of a hoop, and Fig. 5, is a cross sectional elevation of part of a tire showing a modified form of hoop.

A plurality of wire hoops 1 having the shape of the cross section of the tire are threaded into canvas 2, forming part of the tire and so that the said hoops form a series extending throughout the circumference of the tire. The ends of the hoops are formed into loops 3 and circumferential inextensible wires 4 pass through the loops upon each side of the tire. The outer covering 5 of rubber is molded or otherwise attached to the canvas 2, and an inner lining 6 of rubber and fabric is similarly attached to the interior of the canvas. The hoops 1, the canvas 2, the loops 3 and the wires 4, are thus embedded between the outer cover 5 and the inner lining 6 of rubber and fabric.

In Fig. 5 the hoops 1 terminate in hooks 7, which extend along the toe 8 of the tire. The circumferential inextensible wires 4 lie in the kinks 9 of the hooks 7. By inserting the wires 4 in the loops or hooks of the hoops the reinforcement is considerably strengthened.

What I do claim and desire to secure by Letters Patent of the United States is:—

1. A reinforcement for pneumatic tires consisting of a plurality of independent wire hoops each threaded through holes in a common canvas strip and each arranged in a plane radial to the tire, said hoops and canvas being embedded in the tire, and the hoops being of sufficient rigidity to maintain their shape when threaded through the canvas.

2. A reinforcement for pneumatic tires consisting of a plurality of independent wire hoops each threaded through holes in a common canvas strip and each arranged in a plane radial to the tire, said hoops and canvas being embedded between an outer cover of rubber and an inner lining of rubber and canvas and the hoops being of sufficient rigidity to maintain their shape when threaded through the canvas.

3. A reinforcement for pneumatic tires consisting of a plurality of independent wire hoops, terminating in loops, each threaded through holes in a common canvas strip and each arranged in a plane radial to the tire, said hoops and canvas being embedded in the tire and the hoops being of sufficient rigidity to maintain their shape when threaded through the canvas.

4. A reinforcement for pneumatic tires consisting of a plurality of independent wire hoops, terminating in loops, each threaded through holes in a common canvas strip and each arranged in a plane radial to the tire, and inextensible wires passing through said loops, said hoops, canvas and wires being embedded between an outer cover of rubber and an inner lining of rubber and canvas and the hoops being of sufficient rigidity to maintain their shape when threaded through the canvas.

In testimony whereof I have signed my name to this specification in the presence of two witnesses.

MAXTON PATRICK.

Witnesses:
GEORGE ALFRED JAMES HART,
ALFRED JAMES ALLARD.